United States Patent

Morris

[15] 3,693,349
[45] Sept. 26, 1972

[54] SPEED CONTROL FOR HYDRAULIC TRANSMISSION

[72] Inventor: John Morris, The Gable, Plex Moss Lane, Halsall, near Ormskirk, England

[22] Filed: Dec. 11, 1970

[21] Appl. No.: 97,222

[52] U.S. Cl. ............................60/52 VS, 60/53 R
[51] Int. Cl. ......................F15b 15/18, F16d 31/06
[58] Field of Search ......................60/53 R, 52 VS

[56] References Cited

UNITED STATES PATENTS

| | | |
|---|---|---|
| 2,983,101 | 5/1961 | Tyler..........................60/53 R |
| 3,217,493 | 11/1965 | Kempson et al. ..........60/53 R |
| 3,132,487 | 5/1964 | Tyler......................60/52 VS |

*Primary Examiner*—Edgar W. Geoghegan
*Assistant Examiner*—A. M. Zupcic
*Attorney*—Holman & Stern

[57] ABSTRACT

A speed control for a hydraulic transmission having a pump and motor in series has a pair of pumps in an auxiliary series circuit, one of the pair being driven by the motor shaft and the other of the pair being driven at a known reference speed. A pressure difference across the pair of pumps is used to position an actuator which controls the stroke of the motor.

5 Claims, 1 Drawing Figure

PATENTED SEP 26 1972	4,693,349
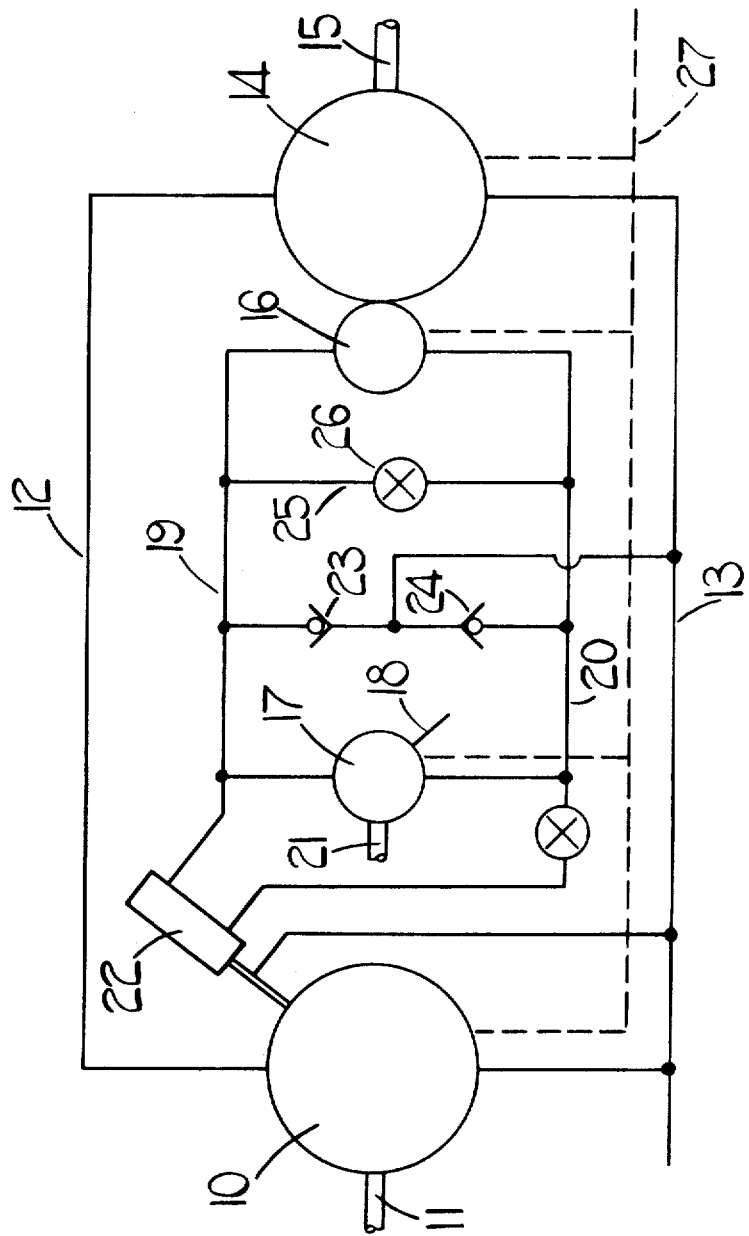
INVENTOR
John Morris
Holman & Stern
ATTORNEYS

SPEED CONTROL FOR HYDRAULIC TRANSMISSION

This invention relates to speed control apparatus for hydraulic power transmission systems which include one or more pumps and one or more motors driven therefrom and in which the speed of the motor or motors is controlled by regulating the output flow of the pump or pumps.

A speed control apparatus of the type specified comprises a first pump hydraulically coupled to a motor whose speed is to be controlled, a second and third pump hydraulically coupled in a closed loop, the said second pump being mechanically coupled to said motor, independent means for driving said third pump, means for setting the output of said third pump to a desired value, and actuating means responsive to a pressure difference across said second and third pumps and adapted to alter, in use, the output of the first pump.

Reference will now be made to the accompanying drawing which shows diagrammatically and by way of example a control apparatus according to the invention.

A first pump 10 having its stroke variable by an actuator in the form of a double-acting piston and cylinder unit 22 and driven by a shaft 11 drives via pressure and return lines 12, 13 respectively, a motor 14 having a fixed stroke and connected to an output shaft 15. A second pump 16 having a fixed stroke has its shaft mechanically coupled to the shaft of the motor 14. A third pump 17 having a stroke variable by a control means 18 is hydraulically coupled in a closed loop to the second pump 16 by lines 19, 20, the direction of flow in the example being from the pump 17 via line 19 to pump 16 and thence via line 20 back to pump 17. The pump 17 is driven by a shaft 21.

The actuator 22 is hydraulically connected across the pumps 16, 17 and co-acts with the pump 10 so that, in use, it increases or decreases the output flow of the pump 10 when the pressure is the greater in line 19 or line 20 respectively. Non-return valves 23, 24 connect lines 19, 20 respectively to the line 13. A line 25 with an associated needle valve 26 permits a proportion of the flow in the closed loop to pass through the line 25 when the pressure difference between lines 19 and 20 is sufficient to operate the valve 26. Pumps 10, 16, 17 and motor 14 include drains which are connected to a low pressure return line 27.

In use the pump 10 is driven at a substantially constant speed by the shaft 11, and in turn drives the motor 14 at a speed proportional to the output flow of the pump 10. The pump 17 is driven, also at a substantially constant speed by the shaft 21.

Assuming initially that the outputs of the pumps 16, 17 are equal, the pressures in the lines 19, 20 will be equal and the actuator 22 will not be urged to vary the output of the pump 10. If the output of the pump 17 is increased by operation of the control means 18, the resultant increased pressure in the line 19 operates the actuator 22 so as to increase the output flow of the pump 10 and thereby to increase the speed of the motor 14 until the consequent increase in the output of the pump 16 causes the pressures in the line 19, 20 once more to be equal. Reduction of the output of the pump 17 will act in a like manner to reduce the speed of the motor 14.

With the output of the pump 17 at a constant value the apparatus will operate as previously described to tend to vary the output of the pump 10 so as to overcome any variation in the speed of the motor 14.

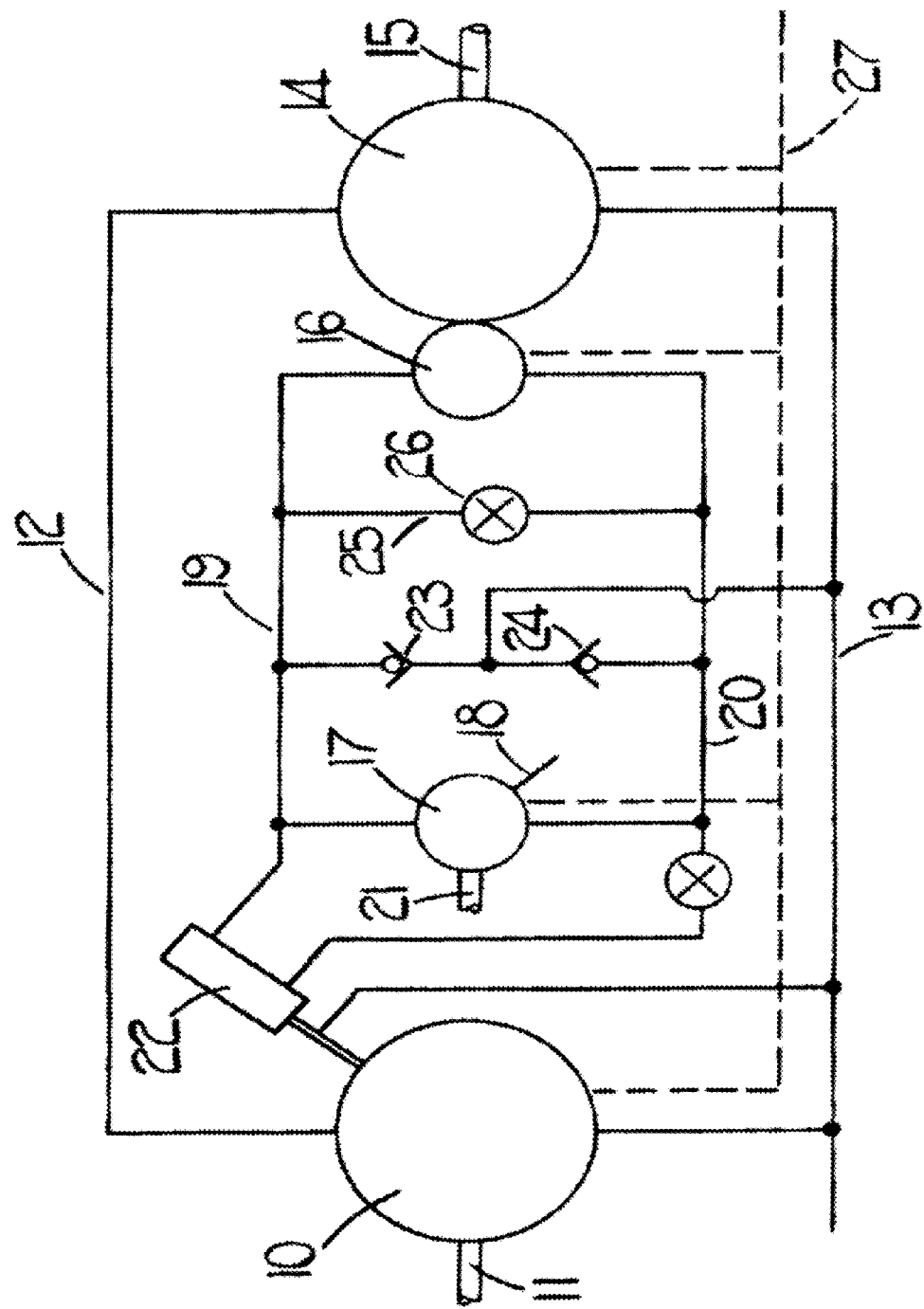

Having thus described my invention what I claim as new and desire to secure by Letter Patent is:

1. A speed control apparatus for a hydraulic power transmission system having a pump and a motor driven therefrom and in which motor speed is controlled by regulating the output of the pump comprises a first pump hydraulically coupled to a motor whose speed is to be controlled, a second and third pump hydraulically coupled to a closed loop, the said second pump being mechanically coupled to said motor, independent means for driving said third pump, means for setting the output of said third pump to a desired value, and actuating means responsive to a pressure difference across said second and third pumps and adapted to alter, in use, the output of the first pump.

2. An apparatus as claimed in claim 1 which includes a pressure responsive valve in parallel with the second and third pumps, the said valve bypassing a proportion of the flow in the said loop when the said pressure difference exceeds a predetermined value.

3. An apparatus as claimed in claim 1 in which the actuating means is responsive to an increase in pressure downstream of the second pump to reduce the output of the first pump and to a decrease in the said downstream pressure to increase the output of the first pump.

4. An apparatus as claimed in claim 1 which includes a pair of non-return valves by means of which the upstream and downstream sides of the second pump respectively communicate with the downstream side of the motor.

5. An apparatus as claimed in claim 1 in which the actuating means comprises a double-acting piston and cylinder unit.

* * * * *

UNITED STATES PATENT AND TRADEMARK OFFICE
CERTIFICATE OF CORRECTION

PATENT NO.        : 3,693,349
APPLICATION NO. : 05/097222
DATED             : September 26, 1972
INVENTOR(S)      : Morris It is certified that error appears in the above-identified patent and that said Letters Patent is hereby corrected as shown below:

Delete Drawing Sheet 1 and Substitute therefor the Drawing Sheet consisting of FIG 1 as shown on the attached page.

Signed and Sealed this

Sixteenth Day of December, 2008

JON W. DUDAS
*Director of the United States Patent and Trademark Office*